US009248437B2

(12) United States Patent
Ling et al.

(10) Patent No.: US 9,248,437 B2
(45) Date of Patent: Feb. 2, 2016

(54) HOLLOW SPHERICAL ZEOLITE IM-5 AND PREPARATION METHOD THEREFOR

(71) Applicants: CHINA PETROLEUM & CHEMICAL CORPORATION, Beijing (CN); FUSHUN RESEARCH INSTITUTE OF PETROLEUM AND PETROCHEMICALS, SINOPEC, Fushun, Liaoning (CN)

(72) Inventors: Fengxiang Ling, Liaoning (CN); Weiya Yang, Liaoning (CN); Shaojun Wang, Liaoning (CN); Zhiqi Shen, Liaoning (CN)

(73) Assignees: CHINA PETROLEUM & CHEMICAL CORPORATION, Beijing (CN); FUSHUN RESEARCH INSTITUTE OF PETROLEUM AND PETROCHEMICALS, SINOPEC, Fushun, Liaoning (CN)

( * ) Notice: Subject to any disclaimer, the term of this patent is extended or adjusted under 35 U.S.C. 154(b) by 85 days.

(21) Appl. No.: 14/356,704

(22) PCT Filed: Oct. 30, 2012

(86) PCT No.: PCT/CN2012/001474
§ 371 (c)(1),
(2) Date: May 7, 2014

(87) PCT Pub. No.: WO2013/067765
PCT Pub. Date: May 16, 2013

(65) Prior Publication Data
US 2014/0287910 A1 Sep. 25, 2014

(30) Foreign Application Priority Data

Nov. 10, 2011 (CN) .......................... 2011 1 0353565

(51) Int. Cl.
*C01B 39/48* (2006.01)
*B01J 29/40* (2006.01)
*B01J 29/70* (2006.01)
*B01J 35/02* (2006.01)
*B01J 35/08* (2006.01)

(52) U.S. Cl.
CPC ................ *B01J 29/40* (2013.01); *C01B 39/48* (2013.01); *B01J 29/70* (2013.01); *B01J 35/023* (2013.01); *B01J 35/08* (2013.01); *C01P 2004/34* (2013.01); *C01P 2004/61* (2013.01)

(58) Field of Classification Search
CPC .. C01P 2004/34; C01P 2004/61; B01J 29/70; B01J 35/08
See application file for complete search history.

(56) References Cited

U.S. PATENT DOCUMENTS

| 6,136,290 | A | 10/2000 | Benazzi et al. | |
| 7,276,224 | B2 * | 10/2007 | Zachariah | B82Y 30/00 423/508 |
| 7,972,432 | B2 * | 7/2011 | Guynn | C04B 28/02 106/705 |

FOREIGN PATENT DOCUMENTS

| CN | 1214962 A | 4/1999 |
| CN | 1234012 A | 11/1999 |

(Continued)

OTHER PUBLICATIONS

Lingdong Kong et al., "Synthesis of small crystal zeolite beta in a biphasic H20-CTAB-alcohol system." Materials Letters, 63 (2009), pp. 343-345.
Lei Sun, "Synthesis and Catalytic Properties of IM-5 and Ti-M-5 Zeolites." China Master's Theses Full-text Database, Engineering science and technology I. 2011, Jilin University, China.
Avelino Corma, "IM-5: A Highly Thermal and Hydrothermal Shape-Selective Cracking Zeolite." Journal of Catalysis, 206 (2002), pp. 125-133.
Wang et al., A facile method for the fabrication of IM-5 hollow zeolite sphere in emulsion system, Microporous and Mesoporous Materials, Jul. 14, 2012, 163 (2012) 243-248.

(Continued)

*Primary Examiner* — David M Brunsman
(74) *Attorney, Agent, or Firm* — Novick, Kim & Lee, PLLC; Allen Xue

(57) ABSTRACT

The present invention provides a hollow IM-5 molecular sieve sphere and the preparation process thereof. The process according to the present invention adds a relatively great amount of the surfactant of a cationic quaternary ammonium salt in the IM-5 molecular sieve system, to form a hollow IM-5 molecular sieve sphere via the micelle action by the surfactant, which structure benefits the mass transfer of the reaction process.

18 Claims, 1 Drawing Sheet

(56) References Cited

FOREIGN PATENT DOCUMENTS

| | | |
|---|---|---|
| CN | 1249270 A | 4/2000 |
| CN | 101862669 A | 10/2010 |
| JP | H10-236819 A | 9/1998 |
| WO | 03/043937 A2 | 5/2003 |

OTHER PUBLICATIONS

Chen et al., IM-5 Zeolite Hollow Spheres: Synthesis and Characterization, Chemical Engineering of Oil & Gas, Jul. 6, 2012, pp. 1-7.

Wang et al., Synthesis of nano-zeolite IM-5 by hydrothermal method with the aid of PEG and CTAB, Materials Letters 69 (2012) 16-19.

* cited by examiner

HOLLOW SPHERICAL ZEOLITE IM-5 AND PREPARATION METHOD THEREFOR

This application is a national stage entry under 36 U.S.C. 371 of PCT/CN2012/001474, filed Oct. 30, 2012.

TECHNICAL FIELD

The present invention relates to a hollow IM-5 molecular sieve sphere, i.e., an IM-5 molecular sieve in the form of hollow sphere, and the preparation process thereof, and thus belongs to the field of preparing an inorganic material.

BACKGROUND

The microporous molecular sieve material has regular pore structures and a large surface area, thus is widely used in the fields of adsorption, separation, chemical engineering, catalysis and the like. In recent years, some new structures of molecular sieve materials have been prepared continuously.

IM-5 molecular sieve is a new zeolite prepared using a bi-quaternary ammonium salt as the templet agent. The IM-5 molecular sieve has a pore-passage structure similar to that of ZSM-5, has a two dimensional 10MR crossing pore structure, and has relatively high thermal stability and hydrothermal stability. Thus the ZSM-5 has a broad prospect of application for catalysis in the petrochemical fields of paraffin cracking, isomerization of n-butylene, preparation of gasoline from Synthesis Gas and the like.

Journal of Molecular Catalysis A: Chemical, 2000, 162: 175-189 Discloses to obtain an IM-5 molecular sieve using 1,1-(pentamethylene)bis-(1-methylpyrrolidinium)bromide as the templet agent, under the condition of adding a promoter of sodium bromide and static hydrothermal conditions at a temperature of 175 degrees C.

Journal of Catalysis 215 (2003) 151-170 discloses to obtain an IM-5 molecular sieve using 1,1-(pentamethylene) bis-(1-methylpyrrolidinium)bromide as the templet agent, under the dynamic hydrothermal condition at a temperature of 160 degrees C.

CN1234012A discloses an IM-5 molecular sieve and the preparation process thereof. The IM-5 molecular sieve is obtained from hydrothermal crystallization at a temperature of 170 degrees C. by adding additional NU-88 powder as a seed crystal.

By studying the products prepared according to the documents above, it can be seen that the IM-5 molecular sieves obtained from prior arts have a morphology of two dimensional rod form with a diameter of generally 50 nm or more and an aspect ratio of generally about 5.

Currently, the preparation of the molecular sieve having a hollow sphere structure is highly interested in the art, in addition to the molecular sieve materials having rod, strip, massive, sphere forms and the like. This is because the special hollow structure may generally cause some special properties of the material, particularly for the catalysis, adsorption, controlled release of medicaments, nano-photoelectricity and the like.

Currently, the hollow sphere of a molecular sieve is prepared predominantly by using a polystyrene microsphere as templet, combining the layer-layer self assembly and a hydrothermal or gas-phase conversion crystallization process. The typically related documents comprise: Chem. Commun., 2000, 2161-2162 and Adv. Mater. 2006, 18, 801-806. This process preparing the molecular sieve hollow sphere using the polymer microsphere as a hard templet has complicated operation steps, poor controllability and relatively high cost.

CN101618336A prepares a MCM-22 molecular sieve hollow sphere by hydrothermal crystallization using carbon black particles as a templet. The carbon black templet has broader sources and lower cost compared with the polystyrene microsphere templet; however, due to the non-uniformity of the carbon black particle as well as a particle size of generally 20 microns or more, the hollow sphere obtained has a relatively large particle size, and correspondingly a thin pore wall, such that the hollow sphere is easy to be broken.

It can be seen that the current preparation with the molecular sieve hollow sphere uses generally a polymer micro sphere and a hard templet such as carbon black and the like, thus the controllability is insufficient. Meanwhile, the amount of the hard templet used is relatively great, which is difficult to be burnt off, and the burn off of the templet may bring abundant environmental pollutants.

SUMMARY OF THE INVENTION

The present invention provides an IM-5 molecular sieve in the form hollow sphere and a process of preparing the hollow IM-5 molecular sieve sphere using a soft templet. According to the process of the present invention, a hollow IM-5 molecular sieve sphere can be obtained based on a hydrothermal system conventionally used for preparing IM-5 molecular sieve, with the further incorporation of a cationic surfactant.

The hollow IM-5 molecular sieve sphere according to the present invention has an outer diameter for the hollow sphere of about 2-about 15 μm, preferably that the outer diameter is not less than about 3 μm, and more preferably not less than about 4 μm; preferably that the outer diameter is not more than about 13 μm, not more than about 12 μm, not more than about 10 μm, more preferably not more than about 9 μm, or not more than about 8 μm. For example, the outer diameter is preferably about 2-about 10 μm, more preferably about 4-about 8 μm. The wall of the hollow sphere consists essentially of small IM-5 crystal grains having a particle size of about 10-about 500 nm, preferably about 10-about 200 nm. The wall thickness of the hollow sphere is generally about 10%-about 40%, preferably about 15%-about 30%, of the outer diameter of the hollow sphere.

The process of preparing the hollow IM-5 molecular sieve sphere according to the present invention comprises:

(1) mixing an alkali source, a templet agent, an aluminum source, water, a silicon source and a cationic surfactant (represented as SUR$^+$), and stirring the mixture at a suitable temperature to generate a sol; and (2) elevating the temperature of the mixture of step (1) in a hydrothermal reactor to about 140-about 200 degrees C., after hydrothermal crystallization of about 2-about 15 days, taking out and separating the solid product, drying and calcinating to obtain a hollow IM-5 molecular sieve sphere.

In step (1), the temperature for stirring is about 20-about 70 degrees C., preferably about 55-about 65 degrees C. The duration of stirring is about 1-about 24 hours, preferably about 10-about 20 hours.

In step (1), among various materials, the cationic surfactant is preferably added at the last. Before adding the cationic surfactant, it is preferable to carry out an ultrasonic dispersion to the mixture. The frequency used for the ultrasonic dispersion is 10-100 kHz. The temperature for the ultrasonic dispersion is about 20-about 70 degrees C., preferably about 55-about 65 degrees C. The duration of the ultrasonic dispersion is about 1-about 24 hours, preferably about 10-about 20 hours. In step (1), the alkali source is sodium hydroxide, potassium hydroxide, lithium hydroxide or the combination thereof, preferably sodium hydroxide. The templet agent is 1,1'-(pentamethylene) bis(1-methylpyrrolidinium), having a structural formula of:

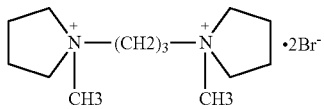

The aluminum source is aluminum nitrate, aluminum chloride, aluminum sulfate, or a combination thereof, preferably aluminum nitrate, aluminum chloride, or a combination thereof. The silicon source is white carbon, silicic acid, silanolate, silica sol, silica gel, or a combination thereof, preferably white carbon. The surfactant is one or more cationic quaternary ammonium salts having a carbon chain of 12-18 carbon atoms, wherein the carbon chain is preferably a normal alkane; and the corresponding negative ion for the cationic quaternary ammonium salt is a bromide ion or chloride ion, preferably bromide ion. The cationic quaternary ammonium salt having a carbon chain of 12-18 carbon atoms includes, but not limited to, octodecyl trimethylammonium bromide, cetyl trimethylammonium bromide, myristyl trimethylammonium bromide, and dodecyl trimethylammonium bromide.

In step (1), the molar ratios calculated based on the following species for the various components of the reaction mixture are:

$SiO_2/Al_2O_3$ of about 30-about 70, preferably of about 40-about 70;

$R/SiO_2$ of about 0.3-about 0.6, preferably about 0.3-about 0.45, R representing the templet agent;

$H_2O/SiO_2$ of about 20-about 90, preferably about 50-about 90;

$OH^-/SiO_2$ of about 0.5-about 0.8, preferably about 0.6-about 0.75; and $R/SUR^+$ of about 0.3-about 4.5, preferably not less than about 0.4, not less than about 0.5, or not less than about 0.6; and preferably not more than about 4, not more than about 3.5, not more than about 3, not more than about 2.5, not more than about 2, or not more than about 1.5; for example, the ratio is preferably about 0.6-about 1.5, wherein the $SUR^+$ represents the cationic surfactant.

In step (2), the temperature for the hydrothermal crystallization is about 160-about 185 degrees C., more preferably about 165-about 175 degrees C. The duration of the hydrothermal crystallization is about 7-about 12 days.

The product obtained has particular reactivities for the fields of paraffin cracking, isomerization of n-butylene, preparation of gasoline from synthetic gas and the like, particularly for a reaction process having relatively large molecules as reactants such as paraffin cracking or a reaction process in need of a high space velocity.

As compared with the conventional hydrothermal process, the process according to the present invention adds a relatively great amount of the cationic quaternary ammonium salt having a carbon chain of 12-18 carbon atom in the IM-5 molecular sieve system, in which the cationic quaternary ammonium salt, in combination with the templet agent, forms a hollow IM-5 molecular sieve sphere, which structure benefits the mass transfer of materials. The process of preparing the molecular sieve hollow sphere utilizing the micelle of a quaternary ammonium salt as the soft templet according to the present invention uses a little amount of the templet agent, which is easy to be burnt off, resulting in very few emission and little environmental pollution. The product particles obtained are homogeneous and thus is highly controllable.

EMBODIMENTS

Figure 1:
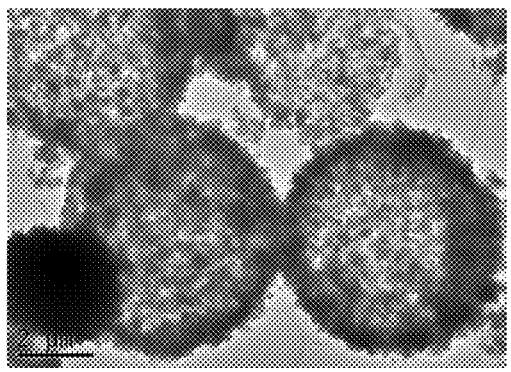
FIG. 1 is a transmission electron micrograph at low range of the hollow IM-5 molecular sieve sphere prepared according to Example 1 of the present invention.
Figure 2:
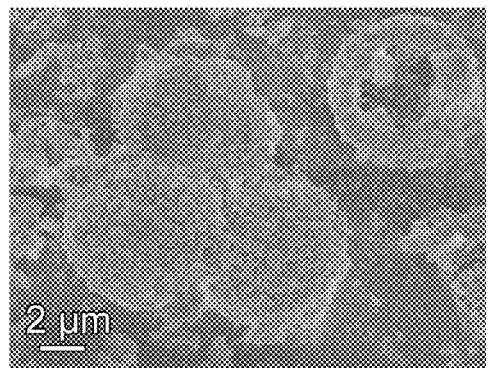
FIG. 2 is a scanning electron micrograph at low range of the hollow IM-5 molecular sieve sphere prepared according to Example 1 of the present invention.
Figure 3:
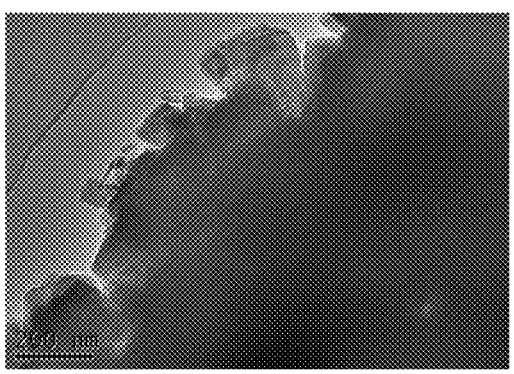
FIG. 3 is a transmission electron micrograph at high range of the hollow IM-5 molecular sieve sphere prepared according to Example 1 of the present invention.
Figure 4:
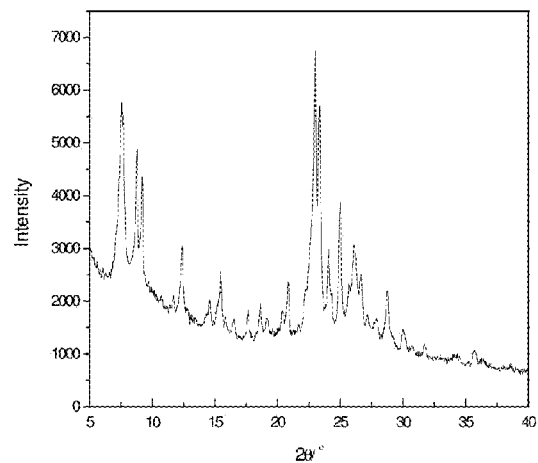
FIG. 4 is a XRD curve of the hollow IM-5 molecular sieve sphere prepared according to Example 1 of the present invention.
Figure 5:
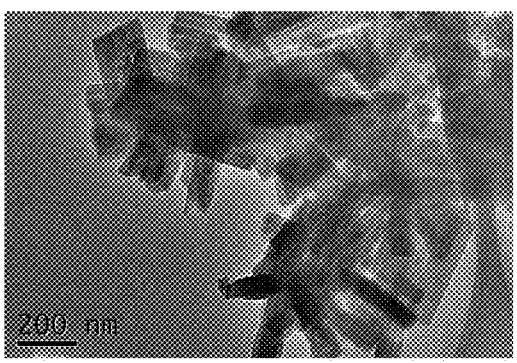
FIG. 5 is a transmission electron micrograph of a conventional IM-5 molecular sieve prepared according to Comparative Example 1 of the present invention.

The outer diameter, wall thickness and grain size of the hollow sphere are measured with transmission electron micrograph and scanning electron micrograph. 20 transmission electron micrographs or scanning electron micrographs are taken randomly, from which the outer diameter, the wall thickness and the grain size of the molecular sieve on the pore wall of the hollow sphere are measured using an image processing software, Image J. In the transmission electron micrograph, regarding an image of the hollow sphere, the length of high contrast area at the external rim of the sphere represents the wall thickness.

The embodiments and effects of the present invention will be further illustrated below by way of Examples.

In the examples, the transmission electron microscope (TEM) is manufactured by JEOL Ltd., Japan, with a model of JEM 2100 (HR), an accelerating voltage of 200 KV, and a resolution of 0.23 nm.

EXAMPLE 1

Sodium hydroxide, 1,1'-(pentamethylene)bis-(1-methylpyrrolidinium)bromide, aluminum nitrate, water, white carbon and cetyl trimethylammonium bromide (CTAB) were mixed, according to molar ratios calculated based on the following species as follows: $SiO_2/Al_2O_3=40$, $OH^-/SiO_2=0.62$, $R/SiO_2=0.45$, $H_2O/SiO_2=50$, and $R/CTAB=0.7$. The mixture obtained was then stirred in a water bath at a temperature of 60 degrees C. to be a homogeneous sol, which sol was kept at the constant temperature for 12 hours with stirring for pre-gelation. Subsequently, the gel was transferred into a hydrothermal reactor, heated to 165 degrees C., hydrothermally crystallized for 10 days, then cooled naturally, filtered and dried to obtain the as-synthesized products powder. By the XRD measurement, the products obtained were all well crystallized IM-5 molecular sieve, which were hollow spheres observed for the morphology with the TEM at low range, having an outer diameter of about 5 μm; while observed with the transmission electron microscope at high range, the wall thereof consisted of small particles with dimensions varying from 10 to 200 nm, resulting in a wall thickness of about 1.4 μm.

EXAMPLE 2

Sodium hydroxide, 1,1'-(pentamethylene)bis-(1-methylpyrrolidinium)bromide, aluminum nitrate, water, white carbon and cetyl trimethylammonium bromide were mixed, according to molar ratios calculated based on the following species as follows: $SiO_2/Al_2O_3=50$, $OH^-/SiO_2=0.70$, $R/SiO_2=0.40$, $H_2O/SiO_2=65$, and $R/CTAB=1.0$. The mixture obtained was then stirred in a water bath at a temperature of 60 degrees C. to be a homogeneous sol, which sol was kept at the constant temperature for 12 hours with stirring for pre-gelation. Subsequently, the gel was transferred into a hydrothermal reactor, heated to 170 degrees C., hydrothermally crystallized for 8 days, then cooled naturally, filtered and dried to provide a molecular sieve coarse powder. By the XRD measurement, the products obtained were all well crystallized IM-5 molecular sieve, which were hollow spheres observed for the morphology with the TEM at low range, having an outer diameter of about 8 μm; while observed with the transmission electron microscope at high range, the wall thereof consisted of small particles with dimensions varying from 40 to 200 nm, resulting in a wall thickness of about 1.6 μm.

EXAMPLE 3

Sodium hydroxide, 1,1'-(pentamethylene)bis-(1-methylpyrrolidinium)bromide, aluminum nitrate, water, white carbon and dodecyl trimethylammonium bromide (DTAB) were mixed, according to molar ratios calculated based on the following species as follows: $SiO_2/Al_2O_3=70$, $OH^-/SiO_2=0.73$, $R/SiO_2=0.45$, $H_2O/SiO_2=85$, and $R/DTAB=1.4$. The mixture obtained was then stirred in a water bath at a temperature of 60 degrees C. to be a homogeneous sol, which sol was kept at the constant temperature for 20 hours with stirring for pre-gelation. Subsequently, the gel was transferred into a hydrothermal reactor, heated to 175 degrees C., hydrothermal crystallized for 7 days, then cooled naturally, filtered and dried to provide a molecular sieve coarse powder. By the XRD measurement, the products obtained were all well crystallized IM-5 molecular sieve, which were hollow spheres observed for the morphology with the TEM at low range, having an outer diameter of about 4 μm; while observed with the transmission electron microscope at high range, the wall thereof consisted of small particles with dimensions varying from 20 to 170 nm, resulting in a wall thickness of about 0.9 μm.

COMPARATIVE EXAMPLE 1

Sodium hydroxide, 1,1'-(pentamethylene)bis-(1-methylpyrrolidinium)bromide, aluminum nitrate, water and white carbon were mixed, according to molar ratios calculated based on the following species as follows: $SiO_2/Al_2O_3=40$, $OH^-/SiO_2=0.62$, $R/SiO_2=0.45$, and $H_2O/SiO_2=50$. The mixture obtained was then stirred in a water bath at a temperature of 60 degrees C. to be a homogeneous sol, which sol was kept at the constant temperature for 12 hours with stirring for pre-gelation. Subsequently, the gel was transferred into a hydrothermal reactor, heated to 165 degrees C., hydrothermal crystallized for 10 days, then cooled naturally, filtered and dried to provide a molecular sieve coarse powder. By the XRD measurement, the products obtained were all well crystallized IM-5 molecular sieve, which had a short-rod form observed for the morphology with the TEM at low range, without the formation of a hollow sphere structure.

The invention claimed is:

1. An IM-5 molecular sieve, characterized in that the IM-5 molecular sieve is in the form of a hollow sphere, the hollow sphere having an outer diameter of about 2-about 15 μm.

2. The IM-5 molecular sieve according to claim 1, characterized in that the wall of the hollow sphere consists of IM-5 crystal grains having a particle size of about 10-about 500 nm.

3. The IM-5 molecular sieve according to claim 2, characterized in that the wall of the hollow sphere consists of IM-5 crystal grains having a particle size of about 10-about 200 nm.

4. The IM-5 molecular sieve according to claim 1, characterized in that the wall thickness of the hollow sphere is about 10%-about 40% of the outer diameter of the hollow sphere.

5. The IM-5 molecular sieve according to claim 4, characterized in that the wall thickness of the hollow sphere is about 15%-about 30% of the outer diameter of the hollow sphere.

6. The IM-5 molecular sieve according to claim 1, characterized in that the hollow sphere having an outer diameter of about 2-about 10 μm.

7. The IM-5 molecular sieve according to claim 1, characterized in that the hollow sphere having an outer diameter of about 4-about 8 μm.

8. A process of preparing the IM-5 molecular sieve according to claim 1, characterized in comprising the steps of:
   (1) mixing an alkali source, a templet agent, an aluminum source, water, a silicon source and a cationic surfactant, and stirring the mixture at a suitable temperature to generate a sol; and
   (2) elevating the temperature of the mixture of step (1) in a hydrothermal reactor to about 140-about 200 degrees C., after hydrothermal crystallization of about 2-about 15 days, taking out and separating the solid product, drying and calcinating to obtain a hollow IM-5 molecular sieve sphere.

9. The process according to claim 8, characterized in that in step (1), the temperature for stirring is about 20-about 70 degrees C.; and the duration of stirring is about 1-about 24 hours.

10. The process according to claim 9, characterized in that in step (1), the temperature for stirring is about 55-about 65 degrees C.; and the duration of stirring is about 10-about 20 hours.

11. The process according to claim 8, characterized in that in step (1), the alkali source is sodium hydroxide, potassium hydroxide, lithium hydroxide or the combination thereof; the templet agent is 1,1'-(pentamethylene)bis(1-methylpyrrolidinium); the aluminum source is aluminum nitrate, aluminum chloride, aluminum sulfate, or a combination thereof; and the silicon source is white carbon, silicic acid, silanolate, silica sol, silica gel, or a combination thereof.

12. The process according to claim 8, characterized in that in step (1), the surfactant is a cationic quaternary ammonium salt having a carbon chain of 12-18 carbon atoms, and the corresponding negative ion is a bromide ion or chloride ion.

13. The process according to claim 8, characterized in that surfactant is octodecyl trimethylammonium bromide, cetyl trimethylammonium bromide, myristyl trimethylammonium bromide or dodecyl trimethylammonium bromide.

14. The process according to claim 8, characterized in that in step (1), the molar ratios calculated based on the following species for the various components of the reaction mixture are:
   $SiO_2/Al_2O_3$ of about 30-about 70;
   $R/SiO_2$ of about 0.3-about 0.6, R representing the templet agent;
   $H_2O/SiO_2$ of about 20-about 90;
   $OH^-/SiO_2$ of about 0.5-about 0.8; and R/SUR$^+$ of about 0.6-about 4.5, wherein the SUR$^+$ represents the cationic surfactant.

15. The process according to claim 14, characterized in that in step (1), the molar ratios calculated based on the following species for the various components of the reaction mixture are, independently, SiO$_2$/Al$_2$O$_3$ of about 40-about 70;
R/SiO$_2$ of about 0.3-about 0.45;
H$_2$O/SiO$_2$ of about 50-about 90;
OH$^-$/SiO$_2$ of about 0.6-about 0.75; and
R/SUR$^+$ of about 0.6-about 1.5.

16. The process according to claim 8, characterized in that in step (2), the temperature for the hydrothermal crystallization is about 160-about 185 degrees C.

17. The process according to claim 16, characterized in that in step (2), the temperature for the hydrothermal crystallization is about 165-about 175 degrees C.

18. The process according to claim 8, characterized in that in step (2), the duration of hydrothermal crystallization is about 7-about 12 days.

* * * * *